United States Patent
Renninger et al.

(10) Patent No.: US 11,668,237 B2
(45) Date of Patent: Jun. 6, 2023

(54) MULTI-STAGE INLET PARTICLE SEPARATOR FOR ROTARY ENGINES

(71) Applicant: General Electric Company, Schenectady, NY (US)

(72) Inventors: Courtney Ann Renninger, Ipswich, MA (US); James R. Noel, Beverly, MA (US); Brian Devendorf, Georgetown, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/398,347

(22) Filed: Aug. 10, 2021

(65) Prior Publication Data

US 2023/0052673 A1 Feb. 16, 2023

(51) Int. Cl.
*F02C 7/052* (2006.01)
*B64D 33/02* (2006.01)

(52) U.S. Cl.
CPC ............. *F02C 7/052* (2013.01); *B64D 33/02* (2013.01); *B64D 2033/0246* (2013.01); *F05D 2260/606* (2013.01); *F05D 2260/607* (2013.01)

(58) Field of Classification Search
CPC . F02C 7/05; F02C 7/052; F02C 7/055; B64D 33/02; B64D 2033/0246; F05D 2260/606; F05D 2260/607
See application file for complete search history.

(56) References Cited

U.S. PATENT DOCUMENTS

| | | | | |
|---|---|---|---|---|
| 3,673,771 | A | * | 7/1972 | Dickey .................. B01D 45/08 55/440 |
| 3,778,983 | A | * | 12/1973 | Rygg ..................... F02C 7/052 55/440 |
| 7,770,375 | B2 | | 8/2010 | Alvanos et al. |
| 9,988,936 | B2 | | 6/2018 | Nasr et al. |
| 10,036,319 | B2 | | 7/2018 | Murray et al. |
| 10,100,734 | B2 | | 10/2018 | Sheoran et al. |
| 10,400,670 | B2 | | 9/2019 | Kiszewski |
| 10,513,979 | B2 | | 12/2019 | Renninger et al. |
| 10,555,653 | B2 | | 2/2020 | Bower et al. |

FOREIGN PATENT DOCUMENTS

| | | | |
|---|---|---|---|
| EP | 3369470 A1 | 9/2018 | |
| GB | 2509886 B | 3/2015 | |
| WO | WO-2007002021 A2 * | 1/2007 | ............. B01D 45/02 |

\* cited by examiner

*Primary Examiner* — Steven M Sutherland
(74) *Attorney, Agent, or Firm* — Venable LLP; Michele V. Frank

(57) ABSTRACT

A particle separator system for a turbine engine having an engine inlet. The particle separator system includes an inlet particle separator located within the engine inlet and configured to remove particles from an incoming airflow. The particle separator system also includes a barrier filter located within an enclosure of the turbine engine downstream of the inlet particle separator, the barrier filter being configured to intercept particles not scavenged by the inlet particle separator.

16 Claims, 4 Drawing Sheets

MULTI-STAGE INLET PARTICLE SEPARATOR FOR ROTARY ENGINES

TECHNICAL FIELD

The present disclosure relates generally to particle separators and, in particular, to a multi-stage inlet particle separator, a hybrid inlet particle separator, and a barrier filter for rotary engines, and a method of separating particles from an airflow.

BACKGROUND

Engines, and, particularly, gas or combustion turbine engines, are rotary engines that extract energy from a flow of combusted gases passing through the engine onto a multitude of turbine blades. Turbine engines have been used for land and nautical locomotion, and power generation. Turbine engines are commonly used for aeronautical applications such as for aircraft, including helicopters and airplanes. In aircraft, turbine engines are used for propulsion of the aircraft. In terrestrial applications, turbine engines are often used for power generation. In addition, fluidic systems where the flow of dirty fluid, such as fluid containing particulate matter, can include a downstream engine, such as in a tank or a power plant.

Turbine engines for aircraft are designed to operate at high temperatures to maximize engine efficiency, so cooling of certain engine components, such as the high pressure turbine and the low pressure turbine, may be needed. Typically, cooling is accomplished by directing or ducting cooler air from the high pressure compressor and/or low pressure compressor to the engine components that require cooling. While the turbine air is at a relatively high temperature, this turbine air is cooler relative to the compressor air, and can be used to cool the turbine engine. Cooling air can be supplied to various turbine engine components, including the interior of the turbine engine blades and the turbine engine shroud.

Particles, such as dirt, dust, sand, volcanic ash, and other environmental contaminants in the engine intake air can cause severe compressor erosion. As the particles move through the turbine engine, the particles can melt in the combustion gases and subsequently resolidify on the turbine flow path surfaces. Particles entrained in the turbine cooling air can cause a loss of cooling due to deposition and plugging of the cooling passages. All of these effects cause reduced operational time or "time-on-wing" (TOW) for the aircraft environment. This problem is exacerbated in certain operating environments around the globe such as in deserts where turbine engines are exposed to significant amounts of airborne particles.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
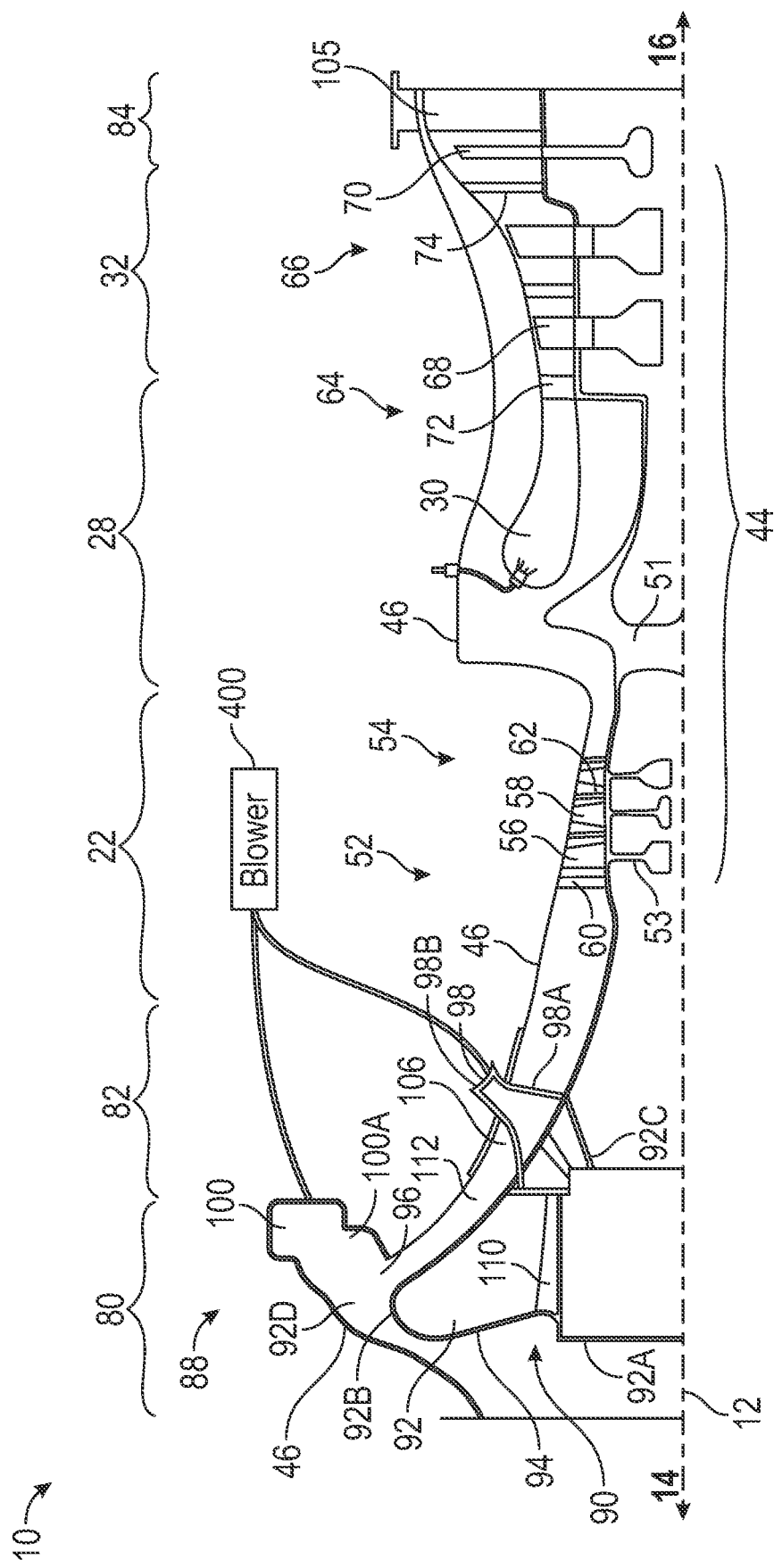
FIG. 1 is a schematic diagram of a turbine engine for an aircraft, according to an embodiment of the present disclosure.

Additional features, advantages, and embodiments of the present disclosure are set forth or apparent from consideration of the following detailed description, drawings, and claims. Moreover, it is to be understood that both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and scope of the present disclosure.

A multi-stage inlet particle separator (IPS) is provided for efficient separation of contaminant particles. The multi-stage IPS includes an axial inlet particle separator (IPS) and a radial inlet particle separator. The multi-stage IPS provides a compact solution to maximize separation efficiency while the occupied space by the multi-stage IPS is reduced. The combination and placement of the multi-stage inlet particle separator (IPS) provides the ability to scavenge flow streams that maximizes the quantity of particulate matter removed from the turbine engine inlet to protect downstream turbine engine components, thus improving product life and reducing maintenance. The multi-stage IPS uses a combination of strategically placed inertial based particle separators to remove particulate matter from the flow upstream of the turbine engine. The multi-stage IPS uses a combination of different style inertial particle separators and the unique placements and/or integration of the system offers high separation efficiency, reduced space, and reduced weight over traditional systems.

Other aspects of the present disclosure further provide a hybrid approach for a turbine engine inlet protection system. The hybrid approach couples the multi-stage IPS with another separation device, such as a barrier filter for maximum separation efficiency while still providing the option to bypass the filter if needed. In an embodiment, the barrier filter can be placed in any desired enclosure or structure, downstream of the inlet particle separator. For example, the barrier filter can be located inside the aircraft inlet, engine inlet, or nacelle and can be placed downstream of the IPS. With this placement of the filter, the IPS can provide partially cleaned air to the filter thereby reducing the load on the filter. The benefits are high levels of sand separation, ram recovery, reduced weight, as well as the ability to provide inlet protection from particulate matter (e.g., sand) even when the filter is bypassed. In an alternate embodiment, the hybrid approach can include an IPS (a single-stage IPS or a multi-stage IPS) mounted upstream of another IPS, either an aircraft mounted IPS or an engine-mounted IPS, e.g., a GE CT7 engine, to achieve near barrier filter efficiency with no maintenance.

This hybrid arrangement may also allow for bypassing of the filter while still retaining some engine protection that barrier filter solutions currently cannot provide. This hybrid arrangement is a step change in particle separation as compared to existing inertial separation systems. Additionally, this arrangement would provide significant mission adaptability when the rotorcraft is not flying in an environment rich with particulate matter, such as in sandy environments. This, thereby, maximizes engine output providing the end user with maximum flexibility.

Rotorcraft operated in sand/dust laden environments experience reduced engine TOW as well as in some extreme circumstances, engine stalls which can lead to failures or even accidents. The ingestion of fine particulate matter such as sand particles or dust may cause significant damage to the engine hot section that may directly result in engine power loss and may lead to engine stalls, both of that lead to reduced TOW. The ingestion of large sand particles may also cause significant damage to the compressor, in particular the first few rotor stages which leads to power loss and potential operability reduction. This can contribute to engine stalls and leads to reduced TOW.

The embodiments of this disclosure extend the performance of typical inlet particle separators to beyond that of inlet barrier filter only solutions, while still allowing for all the benefits of an inlet particle separator solution. The benefits are high levels of separation efficiency, ram recovery, reduced weight, as well as the ability to provide inlet protection (sand, foreign object damage (FOD), etc.) even when the filter is bypassed. The embodiments of this disclosure also allow for mission adaptability that is very important for long range missions, in particular. High-level of separation efficiency, ram recovery, reduced weight, as well as the ability to provide inlet protection (sand, FOD, etc.) even when the filter is bypassed. This configuration may also allow for mission adaptability, which is desirable for long range missions in particular.

Reference will now be made in detail to embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The described embodiments of the present disclosure are directed to systems, methods, and other devices related to particle removal, particularly, in a turbo shaft turbine engine, and more particularly to the removal of particles from the engine intake airflow to a turbine engine. For purposes of illustration, the embodiments will be described with respect to an aircraft turbine engine. It will be understood, however, that the disclosure is not so limited and can have general applicability in non-aircraft applications, such as other mobile applications and non-mobile industrial, commercial, and residential applications.

As used herein, the terms "radial" or "radially" refer to a dimension extending between a center longitudinal axis of the engine, an outer engine circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component. However, the term radial dimension should not be limited to circular or symmetric only and can be any irregular shape (symmetric or asymmetric), e.g., oval for example.

As used herein, the terms "tangential" or "tangentially" refer to a dimension extending perpendicular to a radial line with respect to the longitudinal axis of the engine or the longitudinal axis of a component disposed therein.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements, unless otherwise indicated. As such, connection references do not necessarily imply that two elements are directly connected and in fixed relation to each other. The exemplary drawings are for purposes of illustration only and the dimensions, positions, order, and relative sizes reflected in the drawings attached hereto can vary.

FIG. 1 is a schematic diagram of a turbine engine 10 for an aircraft, according to an embodiment of the present disclosure. The turbine engine 10 has a generally longitudinally extending axis or engine centerline 12 extending from forward 14 to aft 16. The turbine engine 10 includes, in downstream serial flow relationship, a compressor section 22, a combustion section 28 including a combustor 30, and a turbine section 32. The compressor section 22, the combustor 30, and the turbine section 32 form an engine core 44 of the turbine engine 10, which generates combustion gases. An outer casing 46 surrounds the engine core 44. All rotating portions of the turbine engine 10 are referred to individually or collectively as a rotor 51.

The compressor section 22 includes a plurality of compressor stages 52, 54, in which a set of compressor blades 56, 58 rotate relative to a corresponding set of static compressor vanes 60, 62 (also called a nozzle) to compress or to pressurize the stream of fluid passing through the stage. In a single compressor stage 52, 54, multiple rotating compressor blades 56, 58 can be provided in a ring and can extend radially outwardly relative to the engine centerline 12, from a blade platform to a blade tip, while the corresponding static compressor vanes 60, 62 are positioned downstream of and adjacent to the rotating compressor blades 56, 58. It is noted that the number of blades, vanes, and compressor stages shown in FIG. 1 are selected for illustrative purposes only, and that other numbers are possible. The rotating compressor blades 56, 58 for a stage of the compressor can mount to a disk 53 as part of the rotor 51, with each stage having its own disk. The static compressor vanes 60, 62 are mounted to the outer casing 46 in a circumferential arrangement about the rotor 51.

The turbine section 32 includes a plurality of turbine stages 64, 66, in which a set of turbine blades 68, 70 rotate relative to a corresponding set of static turbine vanes 72, 74

(also referred to as a nozzle) to extract energy from the stream of fluid passing through the stage. In a single turbine stage 64, 66, multiple rotating turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 are selected for illustrative purposes only, and that other numbers are possible In operation, air is supplied to the compressor section 22 where ambient air is pressurized. The pressurized air is mixed with fuel in the combustor 30 and ignited, thereby generating combustion gases. Work is extracted from these gases by the turbine section 32, which drives the compressor section 22.

Some of the ambient air can bypass the engine core 44 and be used for cooling of portions, especially hot portions, of the turbine engine 10, and/or used to cool or to power other aspects of the aircraft. In the context of turbine engines, the hot portions of the turbine engine 10 are normally downstream of the combustor 30, especially the turbine section 32, as it is directly downstream of the combustion section 28. Other sources of cooling fluid can be, but are not limited to, fluid discharged from the compressor section 22.

The turbine engine 10 also includes a conduit section 82 having a flow conduit 106 fluidly coupling the compressor section 22 to an inlet section 80 of the turbine engine 10. The inlet section 80 is located axially forward of the compressor section 22. An inlet 90 provides access to an inlet duct 96 fluidly coupled to the flow conduit 106. The flow of air provided to the inlet 90 can pass around a centerbody 92 through the inlet duct 96 and into the flow conduit 106, providing air to the compressor section 22. The turbine engine 10 also includes an outlet section 84 that is axially downstream of the engine core 44 and has one or more struts 105 arranged radially around the engine centerline 12.

The inlet section 80 further includes an inlet particle separator 88 within the inlet 90 and the centerbody 92. The inlet 90 defines an opening for providing a flow of air to the downstream sections. Axially downstream of the inlet 90 is the centerbody 92 having an impact surface 94 formed by a portion of the centerbody 92 opposite to a flow of air provided through the opening of the inlet 90. The inlet duct 96 is defined by the shape of the centerbody 92, as will be described further in detail below.

The inlet particle separator 88 includes a first stage inlet particle separator 98 and a second stage inlet particle separator 100. The first stage inlet particle separator 98 is an axial inlet particle separator and the second stage inlet particle separator 100 is a radial inlet particle separator. The first stage inlet particle separator 98 is provided in a vicinity of an inner centerbody 92A of the centerbody 92. The second stage inlet particle separator 100 is provided at an outer centerbody 92B of the centerbody 92. The inner centerbody 92A includes a plurality of first stage scavenge vanes 92C that are configured to direct a portion of flow of air containing particulate matter towards the first stage inlet particle separator 98. The first stage inlet particle separator 98 includes an air conduit 98A that bypasses the flow conduit 106. The air conduit 98A has an outlet 98B that is located outside of the outer casing 46. The outer centerbody 92B includes the plurality of first stage scavenge vanes 92C that are configured to direct a portion of the flow of air containing particle matter towards the second stage inlet particle separator 100. The second stage inlet particle separator 100 includes a scavenge conduit 100A that directs airflow with particulate matter towards the second stage inlet particle separator 100. The outer centerbody 92B includes a plurality of second stage scavenge vanes 92D configured to direct airflow towards the second stage inlet particle separator 100.

The outer centerbody 92B is radially spaced apart from the inner centerbody 92A. The outer casing 46 is radially spaced apart from the outer centerbody 92B. The inner centerbody 92A and the outer centerbody 92B define a first inlet duct 110 between the inner centerbody 92A and the outer centerbody 92B. The outer centerbody 92B and the outer casing 46 define a second inlet duct 112 between the outer centerbody 92B and the outer casing 46. The second inlet duct 112 is in fluid communication with the flow conduit 106 and the inlet duct 96.

The inlet 90 and the outer centerbody 92B are annular and the inner centerbody 92A is conical such that the inlet duct 96, the first inlet duct 110, and the second inlet duct 112 are radially defined around the engine centerline 12.

Figure 2:
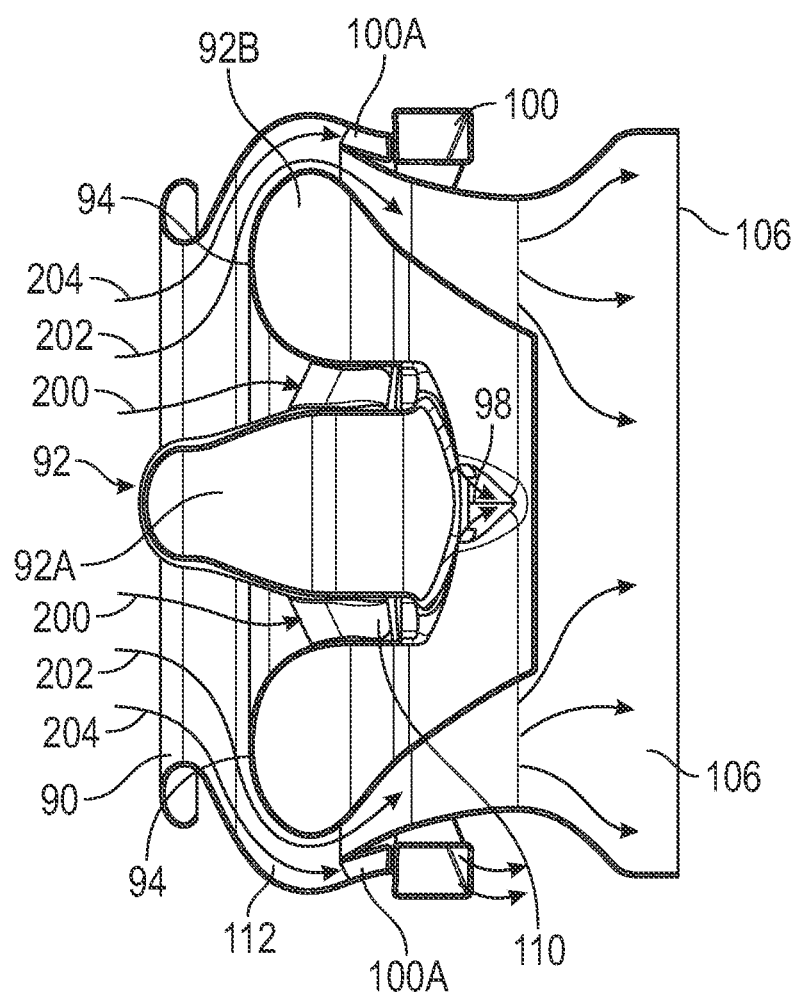
FIG. 2 is a cut-away view of an inlet section and a conduit section of turbine engine showing a location of a first stage inlet particle separator and a location of a second stage inlet particle separator, according to an embodiment of the present disclosure.

FIG. 2 is a cut-away view of the inlet section 80 and the conduit section 82 showing a location of the first stage inlet particle separator 98 and a location of the second stage inlet particle separator 100, according to an embodiment of the present disclosure. As shown in FIG. 2, the first stage inlet particle separator 98 is provided in a vicinity of the inner centerbody 92A of the centerbody 92. The second stage inlet particle separator 100 is provided at the outer centerbody 92B of the centerbody 92. The second stage inlet particle separator 100 includes the scavenge conduit 100A that directs airflow with particulate matter towards the second stage inlet particle separator 100. As illustrated in FIG. 2, airflow illustrated by the three arrows 200, 202 and 204 containing particulate matter is ingested through the inlet 90. The airflow contains various kinds of particles. The particles can be generally divided into two types of particles, a first type of particles comprising essentially momentum dominant particles and a second type of particles comprising essentially drag dominant particles. The momentum dominant particles are generally relatively large particles whereas the drag dominant particles are generally relatively smaller particles. Airflow containing momentum dominant particles depicted by arrow 200 tends to be directed toward the engine centerline 12 (shown in FIG. 1) through the first inlet duct 110. Airflow containing drag dominant particles depicted by arrow 204 tends to be ingested at a radial periphery of the inlet 90 through the second inlet duct 112. Some of the momentum dominant particles in airflow 200 (first airflow) and the drag dominant particles in the airflow 204 (second airflow) impact the impact surface 94 formed by a portion of the outer centerbody 92B of the centerbody 92. The shape and configuration of the impact surface 94 segregates the momentum dominant particles from the drag dominant particles. For example, the shape, positioning and/or orientation of the impact surface 94 can be selected to achieve the desired separation or segregation of the momentum dominant particles from the drag dominant particles. When impacting the impact surface 94, the momentum dominant particles in the airflow 200 will tend to be oriented to be directed toward the inner centerbody 92A and through the first inlet duct 110 to be collected by the first stage inlet particle separator 98. When impacting on the impact surface 94, the drag dominant particles in the airflow 204 will tend to be oriented to be directed toward the outer centerbody 92B and through the second inlet duct 112 to be collected by the second stage inlet particle separator 100. The relatively clean airflow depicted by the arrow 202 (third airflow) is essentially not affected by the shape or configuration of the impact surface 94 as it does not carry particulate matter and continues to flow through the flow conduit 106. A blower system (not shown) can be provided at both an outlet of the first stage inlet particle separator 98 and an outlet of the second stage inlet particle separator 100 to draw the airflow 200 containing momentum dominant particles and/or the airflow 204 containing the drag dominant particles. The blower system can be two separate blowers for each of the airflow 200 and the airflow 204 or a common blower for both the airflow 200 and the airflow 204. As it can be appreciated, the impact surface 94 is configured to separate airflow containing momentum dominant particles and drag dominant particles into a first airflow 200 having essentially momentum dominant particles and a second airflow 204 having essentially drag dominant particles and to direct the first airflow 200 towards the first stage inlet particle separator 98 and to direct the second airflow 204 towards the second stage inlet particle separator 100.

Figure 3:
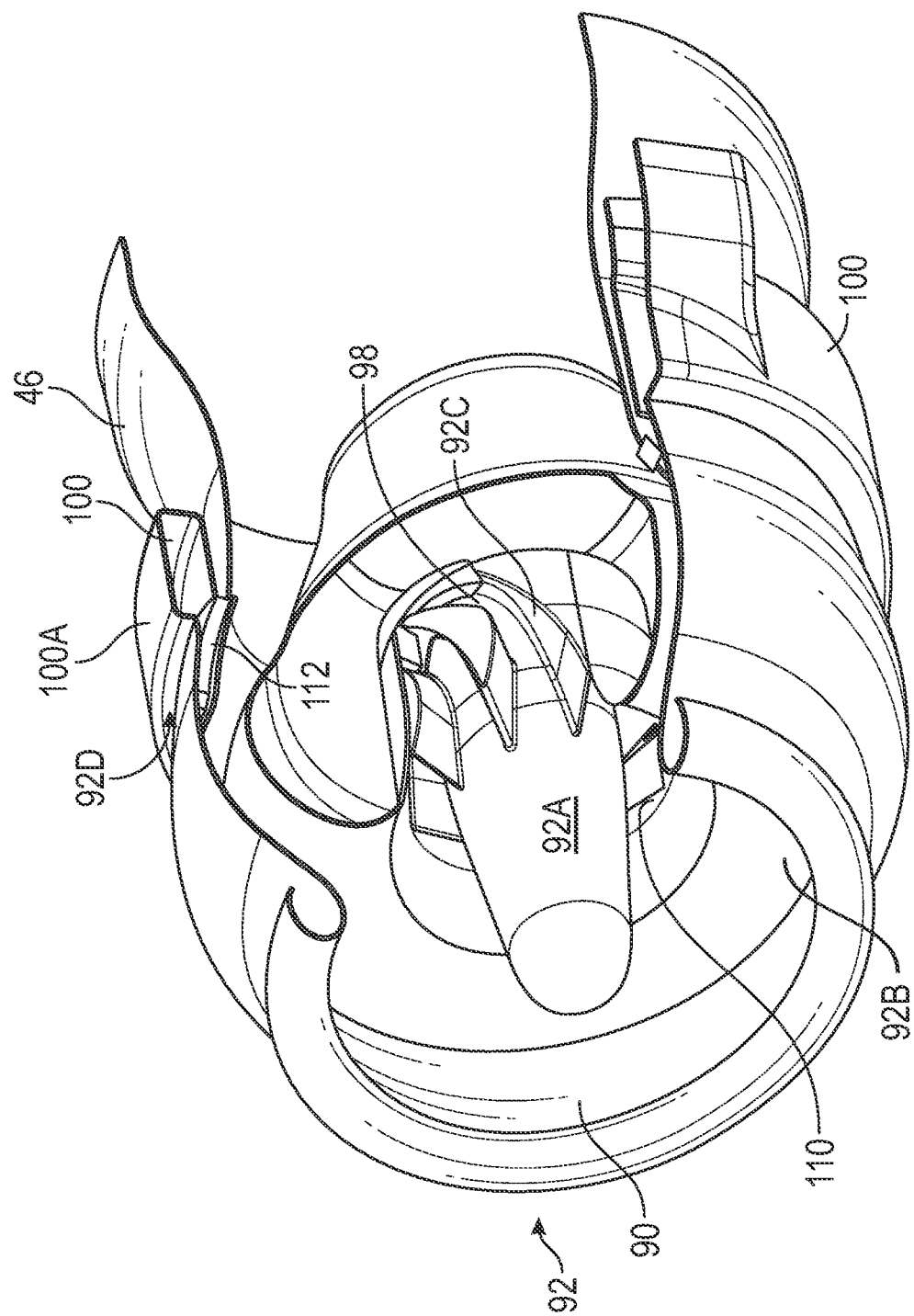
FIG. 3 is a cut-away view of the inlet section and conduit section showing the location of the first stage inlet particle separator and the location of the second stage inlet particle separator, according to an embodiment of the present disclosure.

FIG. 3 is a cut-away view of the inlet section 80 and the conduit section 82 (shown in FIG. 1) showing a location of the first stage inlet particle separator 98 and a location of the second stage inlet particle separator 100, according to an embodiment of the present disclosure. FIG. 3 depicts the first stage inlet particle separator 98 that is provided in a vicinity of the inner centerbody 92A of the centerbody 92. The second stage inlet particle separator 100 is provided at the outer centerbody 92B of the centerbody 92. The inner centerbody 92A includes the plurality of first stage scavenge vanes 92C that are configured to direct a portion of a flow of air containing particle matter towards the first stage inlet particle separator 98. The plurality of first stage scavenge vanes 92C are configured to turn counterclockwise when facing the inlet 90 to guide the airflow laden with momentum dominant particle towards a blower system 400 (shown in FIG. 1). The second stage inlet particle separator 100 includes the scavenge conduit 100A that directs an airflow with particulate matter towards the second stage inlet particle separator 100 and then towards the blower system 400. As shown in FIG. 3, the scavenge conduit 100A wraps circumferentially around the outer casing 46 that surrounds the engine core 44 (shown in FIG. 1).

Figure 4:
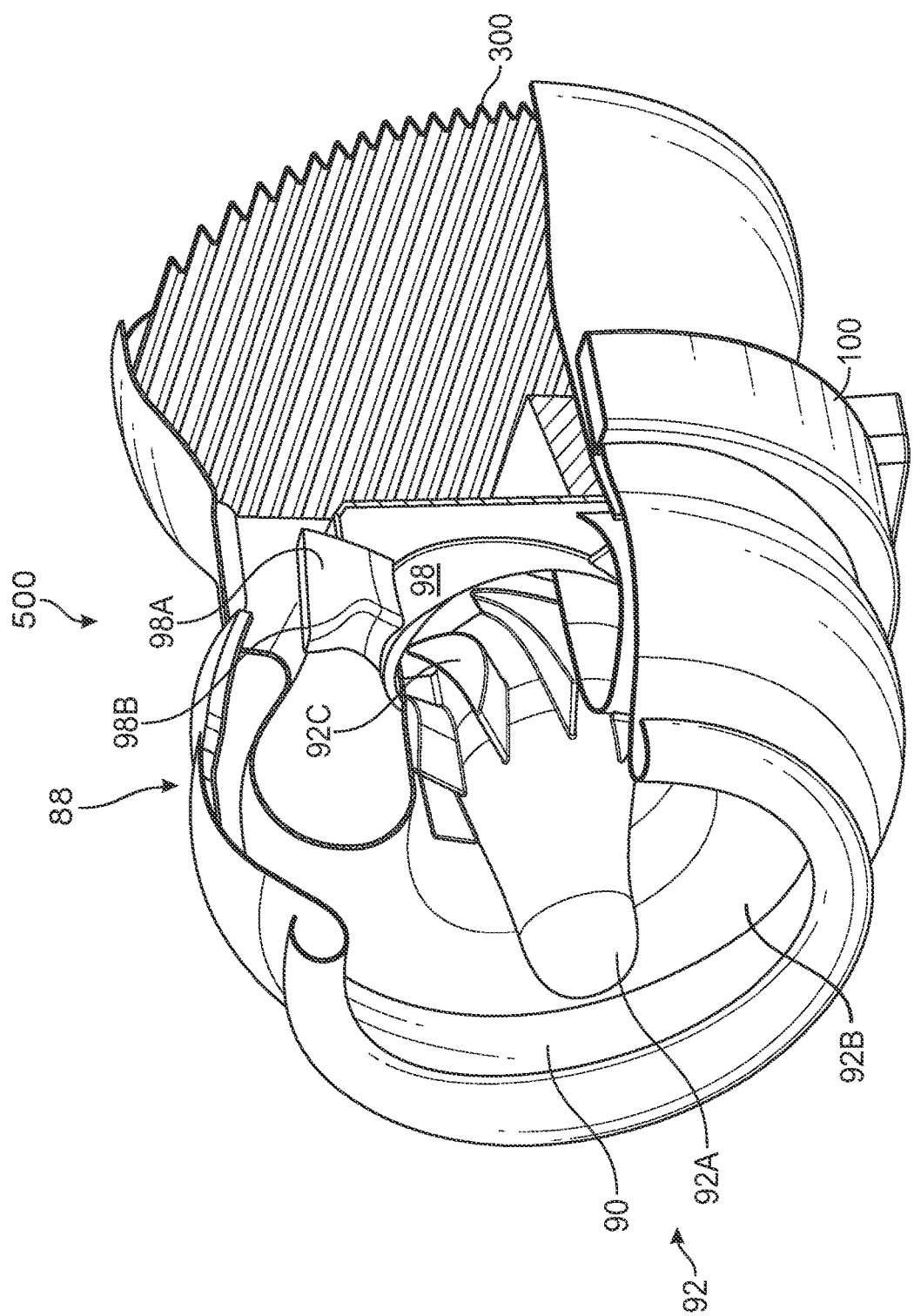
FIG. 4 is a cut-away view of the inlet section and conduit section showing the location of the first stage inlet particle separator and the location of the second stage inlet particle separator, according to another embodiment of the present disclosure.

FIG. 4 is a cut-away view of the inlet section 80 and the conduit section 82 (shown in FIG. 1) showing a location of the first stage inlet particle separator 98 and a location of the second stage inlet particle separator 100, according to another embodiment a particle separator system 500 of the present disclosure. FIG. 4 shows the inner centerbody 92A including the plurality of first stage scavenge vanes 92C that are configured to direct a portion of flow of air containing particle matter towards the first stage inlet particle separator 98. The first stage inlet particle separator 98 includes the air conduit 98A that has the outlet 98B located outside of the outer casing 46. In addition, in this embodiment, as shown in FIG. 4, a barrier filter 300 is provided within the flow conduit 106 fluidly coupling the compressor section 22 to the engine inlet 90 in the inlet section 80 of the turbine engine 10. The barrier filter 300 intercepts particles in airflow 202 that may not have been scavenged using the first stage inlet particle separator 98 or the second stage inlet particle separator 100. The barrier filter 300 can be placed downstream of the first stage inlet particle separator 98 and the second stage inlet particle separator 100. With this placement of the barrier filter 300, the first stage inlet particle separator 98 together with second stage inlet particle separator 100 can provide partially cleaned air to the barrier filter 300, thereby reducing the load on the barrier filter 300. Some benefits of this configuration include high levels of particle separation, ram recovery, and reduced weight, as well as the ability to provide inlet protection from particulate matter even when the barrier filter 300 is bypassed. As such, the barrier filter 300 may not be needed in certain applications and particle reduction or elimination can be accomplished solely by using the first stage inlet particle separator 98 coupled with the second stage inlet particle separator 100. In other applications, however, when, for example, the turbine engine (e.g., on an aircraft) operates in environments rich with particulate matter, the barrier filter 300 may be used to provide an additional filtration system to get rid of particulate matter that may have escaped the filtration system using the first stage inlet particle separator 98 and the second stage inlet particle separator 100. The barrier filter 300 can be made of a porous material or porous filter medium that permits fluid to pass through but substantially blocks or filter out solid particles. For example, the barrier filter 300 can be formed of a porous medium that separates suspended solid matter particles from an airflow by allowing the airflow to pass through the pores of the porous medium while intercepting and blocking solid matter particles due to the size of the solid matter particles being larger than the size of the pores of the porous medium.

This may provide significant mission adaptability for a rotorcraft equipped with a turbine engine having the option to include or to bypass the barrier filter 300 when not flying in an environment rich with particulate matter, such as in sandy environments, thereby maximizing engine output. Thus, providing the end user with maximum flexibility.

As a result, the present described configurations allow for mission adaptability that may be needed for long range missions in particular, high-levels of separation efficiency, ram recovery, and reduced weight, as well as the ability to provide inlet protection (sand, FOD, etc.) even when the filter is bypassed.

Further aspects of the present disclosure are provided by the subject matter of the following clauses.

A particle separator system for a turbine engine having an engine inlet in the inlet section. The particle separator system includes an inlet particle separator located within the engine inlet and configured to remove particles from an incoming airflow. The particle separator system further includes a barrier filter located within an enclosure of the turbine engine downstream of the inlet particle separator, the barrier filter being configured to intercept particles not scavenged by the inlet particle separator.

The inlet particle separator of any preceding clause includes a first stage inlet particle separator provided in a vicinity of an inner centerbody of the engine inlet; and a second stage inlet particle separator provided in a vicinity of an outer centerbody of the engine inlet, the outer centerbody having an impact surface facing incoming airflow through the engine inlet. The impact surface is configured to separate airflow containing momentum dominant particles and drag dominant particles into a first airflow having essentially momentum dominant particles and a second airflow having essentially drag dominant particles and to direct the first airflow towards the first stage inlet particle separator and to direct the second airflow towards the second stage inlet particle separator.

The particle separator system of any preceding clause, wherein the inner centerbody includes a first stage scavenge vanes configured to direct the first airflow having the momentum dominant particles towards the first stage inlet particle separator.

The particle separator system of any preceding clause, wherein the outer centerbody includes a second stage scavenge vanes configured to direct the second airflow towards the second stage inlet particle separator.

The particle separator system of any preceding clause, wherein the first stage inlet particle separator includes a conduit that bypasses a flow conduit configured to direct airflow to a compressor section of the turbine engine.

The particle separator system of any preceding clause, wherein the conduit has an outlet that is located outside of an outer casing of the turbine engine.

The particle separator system of any preceding clause, wherein the first stage inlet particle separator has a first conduit and the second stage inlet particle separator has a second conduit.

A turbine engine including an engine inlet having an inlet particle separator located and configured to remove particles from an incoming airflow. The turbine engine also includes a barrier filter located within an enclosure of the turbine engine downstream of the inlet particle separator, the barrier filter being configured to intercept particles not scavenged by the inlet particle separator.

The engine inlet has an inner centerbody, an outer centerbody radially spaced apart from the inner centerbody, and an outer casing radially spaced apart from the outer centerbody, the inner centerbody and the outer centerbody defining a first inlet duct between the inner centerbody and the outer centerbody, and the outer centerbody and outer casing defining a second inlet duct between the outer centerbody and the outer casing. The engine inlet also includes a first stage inlet particle separator provided in a vicinity of the inner centerbody, and a second stage inlet particle separator provided in a vicinity of the outer centerbody, the outer centerbody having an impact surface facing the engine inlet. The impact surface is configured to separate airflow containing momentum dominant particles and drag dominant particles into a first airflow having essentially momentum dominant particles and a second airflow having drag dominant particle and to direct the first airflow towards through the first inlet duct to the first stage inlet particle separator and to direct the second airflow through the second inlet duct towards the second stage inlet particle separator.

The turbine engine of any preceding clause, further including an engine core provided downstream the inner centerbody and the outer centerbody.

The turbine engine of any preceding clause, further including a compressor section and a flow conduit fluidly coupling the compressor section to the engine inlet.

The turbine engine of any preceding clause, wherein the inner centerbody includes a first stage scavenge vanes configured to direct the first airflow having the momentum dominant particles towards the first stage inlet particle separator.

The turbine engine of any preceding clause, wherein the outer centerbody includes a second stage scavenge vanes configured to direct the second airflow towards the second stage inlet particle separator.

The turbine engine of any preceding clause, wherein the first stage inlet particle separator includes a conduit that bypasses a flow conduit configured to direct airflow to a compressor section of the turbine engine.

The turbine engine of any preceding clause, wherein the conduit has an outlet that is located outside of the outer casing.

The turbine engine of any preceding clause, wherein the first stage inlet particle separator has a first conduit and the second stage inlet particle separator has a second conduit different from the first conduit.

The turbine engine of any preceding clause, further including a barrier filter configured to intercept particles not scavenged by the first stage inlet particle separator and the second stage inlet particle separator A method of separating particles from an airflow in an engine inlet having an inner centerbody, an outer centerbody radially spaced apart from the inner centerbody, and an outer casing radially spaced apart from the outer centerbody, the inner centerbody and the outer centerbody defining a first inlet duct between the inner centerbody and the outer centerbody, and the outer centerbody and outer casing defining a second inlet duct between the outer centerbody and the outer casing, a first stage inlet particle separator provided in vicinity of the inner centerbody, a second stage inlet particle separator provided in vicinity of the outer centerbody, the outer centerbody having an impact surface facing the engine inlet. The method includes (a) receiving airflow containing momentum dominant particles and drag dominant particles through the engine inlet, (b) separating the airflow containing the momentum dominant particles and the drag dominant particles into a first airflow having essentially momentum dominant particles and a second airflow having drag dominant particles, (c) directing the first airflow through the first inlet duct towards the first stage inlet particle separator, and (d) directing the second airflow through the second inlet duct towards the second stage inlet particle separator.

The method of any preceding clause, further including directing a third airflow containing substantially reduced particle load to a compressor section provided downstream of the inner centerbody and the outer centerbody.

The method of any preceding clause, wherein directing the first airflow through the first inlet duct towards the first stage inlet particle separator includes directing the first airflow having the momentum dominant particles towards the first stage inlet particle separator using first stage scavenge vanes provided within the inner centerbody.

The method of any preceding clause, wherein directing the second airflow through the second inlet duct towards the second stage inlet particle separator includes directing the second airflow having drag dominant particles towards the second stage inlet particle separator using second stage scavenge vanes provided within the outer centerbody.

The method of any preceding clause, further including directing the first airflow through a first conduit and directing the second airflow through a second conduit different from the first conduit.

The method of any preceding clause, wherein separating the airflow containing the momentum dominant particles and the drag dominant particles into a first airflow having essentially momentum dominant particles and a second airflow having drag dominant particles includes separating the airflow into the first airflow, the second airflow and a third airflow having substantially reduced particle load.

The method of any preceding clause, further comprising intercepting particles not scavenged by the first stage inlet particle separator and the second stage inlet particle separator using a barrier filter.

Although the foregoing description is directed to the preferred embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A particle separator system for a turbine engine having an engine inlet, the particle separator system comprising:
an inlet particle separator located within the engine inlet and configured to remove particles from an incoming airflow, the inlet particle separator comprising:
a first stage inlet particle separator provided in a vicinity of an inner centerbody of the engine inlet; and
a second stage inlet particle separator provided in a vicinity of an outer centerbody of the engine inlet, the outer centerbody having an impact surface facing the incoming airflow through the engine inlet, wherein the impact surface is configured to separate airflow containing momentum dominant particles and drag dominant particles into a first airflow having essentially momentum dominant particles and a second airflow having essentially drag dominant particles and to direct the first airflow towards the first stage inlet particle separator and to direct the second airflow towards the second stage inlet particle separator; and
a barrier filter located within an enclosure of the turbine engine downstream of the inlet particle separator, the barrier filter being configured to intercept particles not scavenged by the inlet particle separator,
wherein the first stage inlet particle separator includes a conduit that bypasses a flow conduit configured to direct airflow to a compressor section of the turbine engine.

2. The particle separator system according to claim 1, wherein the inner centerbody comprises a plurality of first stage scavenge vanes configured to direct the first airflow having the momentum dominant particles towards the first stage inlet particle separator.

3. The particle separator system according to claim 1, wherein the outer centerbody comprises a plurality of second stage scavenge vanes configured to direct the second airflow towards the second stage inlet particle separator.

4. The particle separator system according to claim 1, wherein the conduit has an outlet that is located outside of an outer casing of the turbine engine.

5. A turbine engine comprising:
an engine inlet having an inlet particle separator located and configured to remove particles from an incoming airflow, the engine inlet comprising:
an inner centerbody, an outer centerbody radially spaced apart from the inner centerbody, and an outer casing radially spaced apart from the outer centerbody, (i) the inner centerbody and the outer centerbody defining a first inlet duct between the inner centerbody and the outer centerbody (ii) the outer centerbody and the outer casing defining a second inlet duct between the outer centerbody and the outer casing;
a first stage inlet particle separator provided in a vicinity of the inner centerbody; and
a second stage inlet particle separator provided in a vicinity of the outer centerbody, the outer centerbody having an impact surface facing the engine inlet, wherein the impact surface is configured to separate airflow containing momentum dominant particles and drag dominant particles into a first airflow having essentially momentum dominant particles and a second airflow having drag dominant particles and to direct the first airflow towards through the first inlet duct to the first stage inlet particle separator and to direct the second airflow through the second inlet duct towards the second stage inlet particle separator; and
a barrier filter located within an enclosure of the turbine engine downstream of the inlet particle separator, the barrier filter being configured to intercept particles not scavenged by the inlet particle separator,
wherein the first stage inlet particle separator includes a conduit that bypasses a flow conduit configured to direct airflow to a compressor section of the turbine engine.

6. The turbine engine according to claim 5, wherein the flow conduit fluidly couples the compressor section to the engine inlet.

7. The turbine engine according to claim 5, further comprising an engine core provided downstream of the inner centerbody and the outer centerbody.

8. The turbine engine according to claim 5, wherein the inner centerbody comprises a plurality of first stage scavenge vanes configured to direct the first airflow having the momentum dominant particles towards the first stage inlet particle separator.

9. The turbine engine according to claim 5, wherein the outer centerbody comprises a plurality of second stage scavenge vanes configured to direct the second airflow towards the second stage inlet particle separator.

10. The turbine engine according to claim 5, wherein the conduit has an outlet that is located outside of the outer casing.

11. A method of separating particles from an airflow in a turbine engine having an inner centerbody, an outer centerbody radially spaced apart from the inner centerbody, and an outer casing radially spaced apart from the outer centerbody, the inner centerbody and the outer centerbody defining a first inlet duct between the inner centerbody and the outer centerbody, and the outer centerbody and outer casing defining a second inlet duct between the outer centerbody and the outer casing, a first stage inlet particle separator provided in a vicinity of the inner centerbody, and a second stage inlet particle separator provided in a vicinity of the outer centerbody, the outer centerbody having an impact surface facing an engine inlet of the turbine engine, the first stage inlet particle separator including a conduit that bypasses a flow conduit configured to direct airflow to a compressor section of the turbine engine, the method comprising:
receiving airflow containing momentum dominant particles and drag dominant particles through the engine inlet;
separating the airflow containing the momentum dominant particles and the drag dominant particles into a first airflow having essentially momentum dominant particles and a second airflow having drag dominant particles;
directing the first airflow through the first inlet duct towards the first stage inlet particle separator; and
directing the second airflow through the second inlet duct towards the second stage inlet particle separator.

12. The method according to claim 11, further comprising directing a third airflow containing substantially reduced particle load to the compressor section provided downstream of the inner centerbody and the outer centerbody.

13. The method according to claim 11, wherein directing the first airflow through the first inlet duct towards the first stage inlet particle separator comprises directing the first airflow having the momentum dominant particles towards the first stage inlet particle separator using a plurality of first stage scavenge vanes provided within the inner centerbody.

14. The method according to claim 11, wherein directing the second airflow through the second inlet duct towards the second stage inlet particle separator comprises directing the second airflow having drag dominant particles towards the second stage inlet particle separator using a plurality of second stage scavenge vanes provided within the outer centerbody.

15. The method according to claim 11, further comprising directing the first airflow through a first conduit and directing the second airflow through a second conduit different from the first conduit.

16. The method according to claim 11, further comprising intercepting particles not scavenged by the first stage inlet particle separator and the second stage inlet particle separator using a barrier filter.

\* \* \* \* \*